Aug. 15, 1944.                    J. J. McGLOTHLIN                    2,355,663
                                      TRAILER
                              Filed March 8, 1943                 2 Sheets-Sheet 1
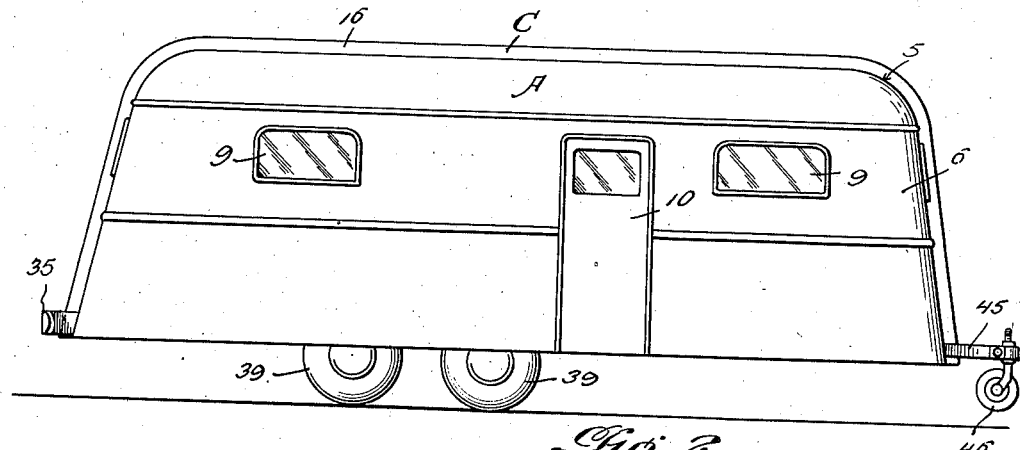
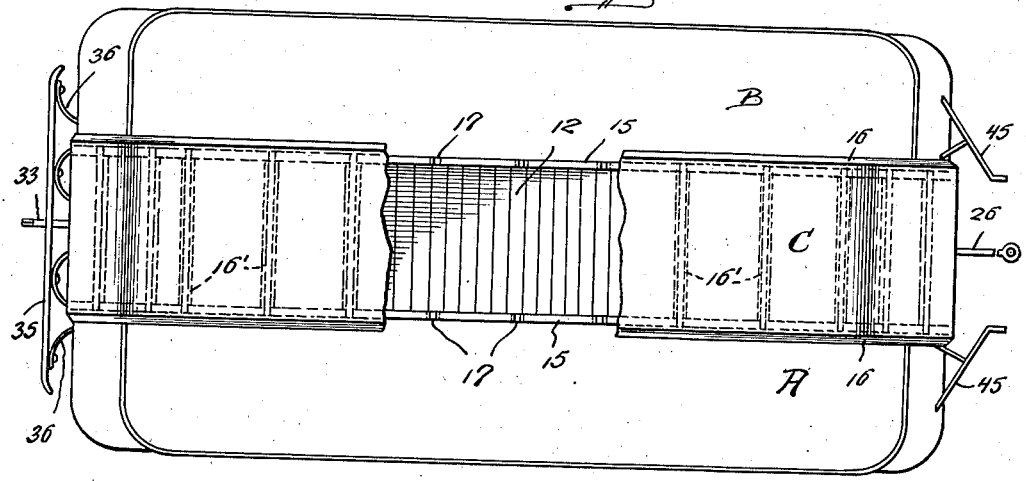
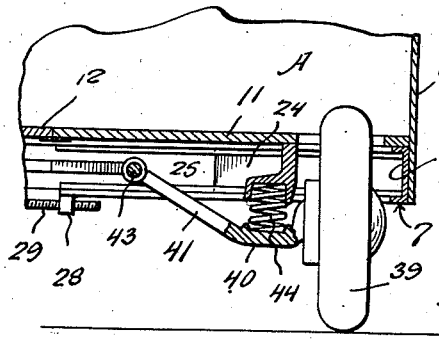
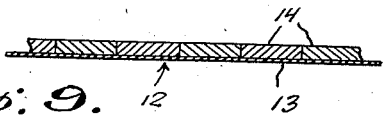
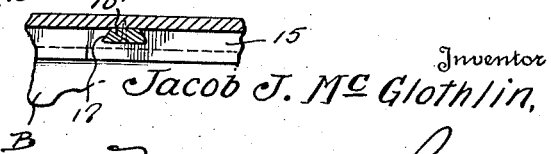
Inventor
Jacob J. McGlothlin,
By McMorrow & Berman
Attorneys

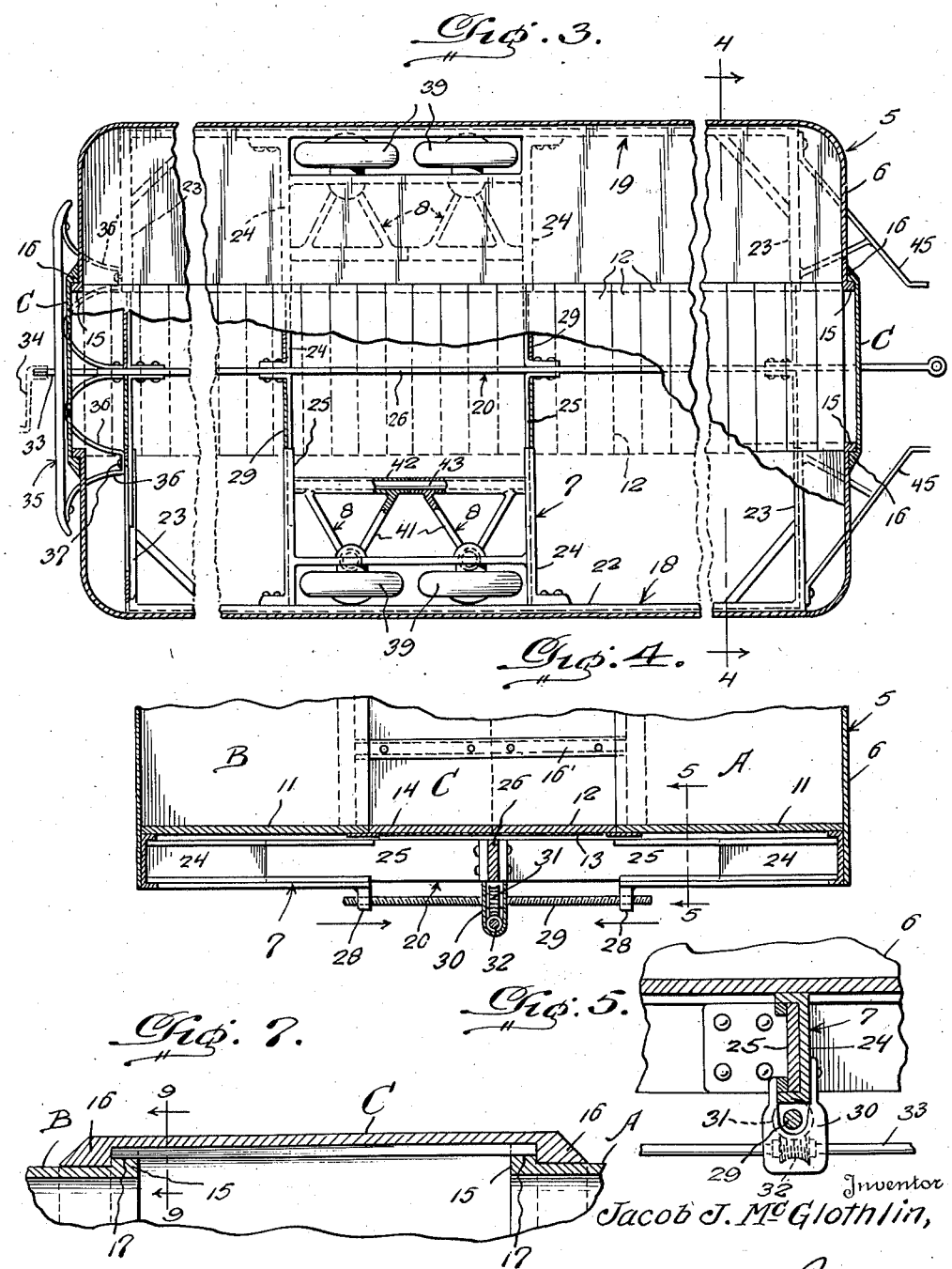

Patented Aug. 15, 1944

2,355,663

UNITED STATES PATENT OFFICE 2,355,663

TRAILER

Jacob J. McGlothlin, Rowlandville, Md.

Application March 8, 1943, Serial No. 478,393

2 Claims. (Cl. 296—23)

This invention relates to trailers especially adapted for use as living and transporting quarters and to be towed by any type of motor vehicle now in use.

The primary object of the invention is to provide a device of the above stated character which may have its width either increased or decreased for the purpose of providing adequate or a maximum amount of floor space for the living quarters when parked and to permit the device to be safely moved over highways as not to interfere with other traffic which may pass and to travel through lanes of traffic as that of any other motor vehicle.

Another object of this invention is the provision of improved wheel mountings which will permit the trailer body as well as the trailer frame to be adjusted as to width and will provide knee action for the wheels, that is, each wheel may have vertical movement with cushioning action independently of the other wheels to assure a maximum amount of riding quality by the trailer.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a trailer constructed in accordance with my invention.

Figure 2 is a top plan view, partly broken away, illustrating the trailer.

Figure 3 is a longitudinal sectional view showing the means of adjusting the trailer as to its width.

Figure 4 is a transverse sectional view taken on the line 4—4 of Figure 3.

Figure 5 is a detail sectional view taken on the line 5—5 of Figure 4.

Figure 6 is a fragmentary transverse sectional view illustrating the mounting for one of the wheels.

Figure 7 is a fragmentary transverse sectional view showing the construction of the intermediate section of the body.

Figure 8 is a fragmentary sectional view showing an intermediate section of flooring for the body of the trailer.

Figure 9 is a detail sectional view taken on the line 9—9 of Figure 7.

Referring in detail to the drawings, the numeral 5 indicates in entirety a trailer especially constructed to provide living quarters of adequate space and still be able to be moved or pulled over a highway with a maximum amount of safety by having its width reduced over its normal width when parked and used to live within. The trailer 5 is composed primarily of a body 6, a frame 7 and a running gear 8. The body and frame are so constructed that the width of the trailer may be easily increased or decreased through the actuation of a suitable operating mechanism. The running gear 8 is of a construction to provide a maximum amount of comfortable riding quality to the trailer when moved over the highway by permitting each wheel to have knee action, that is, each wheel may move vertically independently of the other wheels with a cushion action for the purpose of absorbing road shocks.

The body 6 is provided with suitable windows 9 in the sides and ends thereof and a door 10 in one side to give access to the body. The door 10 may be of the windowed type, as shown in Figure 1.

The body is preferably of channeled construction and consists of side sections A and B and an intermediate section C. The intermediate section C extends from the forward end of the body to the rear end and is slidably connected with the sections A and B whereby the sections A and B may be moved toward and from each other for the purpose of increasing and decreasing the width of the interior area of the body. The sections A and B are provided with flooring 11 which moves with the sections A and B, while the intermediate section includes a removable flooring 12 preferably of the type which can be easily arranged in roll form when not in use and consists of a flexible strip 13 to which a plurality of rigid strips 14 are secured. The flooring 12 of the construction described may be readily unrolled and laid flatly to rest on the floorings 11 or to be suitably secured thereto when the body of the trailer is extended to its fullest width and may be readily taken up and arranged in roll form when the body 6 of the trailer is decreased as to width.

The sections A and B have formed upon their adjacent edges and extending from end to end of the body and over the roof of the latter ribs 15 to act as stops for abutting shoulders 16 formed on the intermediate section C when the body 6 is extended to its fullest width.

By referring to Figures 2 and 3, it will be seen that the intermediate section C of the body extends from the forward to the rear end of the body and over the roof thereof and has secured to its inner face spaced locking strips 16', the opposite edges of which are beveled so as to fit dovetail shaped grooves 17 formed in the ribs 15 of the sections A and B thereby slidably locking the sections A, B and C together. The strips 16' fitting within the grooves 17 will permit free sliding movement of the sections A and B relative to the section C but will prevent the section C from moving off of the sections A and B at any time.

The ribs 15 and shoulders 16 when in abutting engagement will establish leakproof connections between the sections A, B and C. Thus it will be seen that the construction of the body 6 is such that the width thereof may be readily increased and decreased as desired.

The frame 7 is composed of sections 18, 19 and 20. The sections 18 and 19 are similarly constructed and have telescopic relation to the section 20 whereby the sections 18 and 19 may be moved or adjusted toward and from each other. The sections A and B of the body are secured to the sections 18 and 19 so as to move with said sections 18 and 19 when the latter are adjusted for increasing and decreasing the width of the body. The sections 18, 19 and 20 of the frame 7 when assembled will form the frame of substantially rectangular shape. The sections 18 and 19 are constructed of rigid side members 22, and rigid members 23 and transverse rigid members 24. The members 23 and 24 telescopically receive transverse members 25 which form part of the intermediate section 20. The intermediate section 20 also includes a rigid longitudinally extending bar 26 suitably secured to the transversely arranged members 25. The members 23 and 24 of the sections 18 and 19 having telescopic relation with the members 25 of the intermediate section will permit the sections 18 and 19 to be adjusted toward and from each other.

Formed on the sections 18 and 19 of the frame 7 are threaded ears 28 to receive threaded rods 29 which are each provided with right and left screw threads, the ears 28 being threaded accordingly. The rods 29 are journaled in suitable housings 30 suspended on the intermediate section 20 of the frame. The rods 29 have secured thereto worm gears 31 which mesh with worms 32 secured on an operating shaft 33 extending longitudinally of the frame 7 and under the latter being suitably journaled in the housings 30. The operating shaft protrudes beyond the rear end of the frame and is shaped to receive a crank handle 34 whereby the operating shaft may be rotated manually in opposite directions and thereby bring about movement of the sections 18 and 19 of the frame toward and from each other.

The rear end of the trailer may be equipped with a bumper 35 for protection and is of a character employing cushion members 36 secured to the transverse members 25 of the intermediate section 20 by fasteners 37. The fasteners 37 operate in suitable slots provided in the rear end members 23 of the sections 19 of the frame so that the sections 18 and 19 may be adjusted toward and from each other without being interfered with by the bumper 35.

The members 24 of the sections 18 and 19 of the frame have the wheels 39 mounted thereon, the wheels being grouped in pairs and in tandem relation. The wheels 39 are journaled on axles 40 which include V-shaped portions 41 integrally connected with a pair of sleeves 42 journaled on each of rods 43 secured to the members 24 of the sections 18 and 19 of the frame whereby the wheels may move vertically independently of each other. Coil type cushioning springs 44 are mounted on the axles 40 and on the frame for the purpose of cushioning the movement of the axles and to absorb road shocks. The frame and axles are constructed to provide suitable seats for the springs 44.

The forward end of the frame is provided with a suitable draft construction which may be easily coupled to a towing motor vehicle and is indicated by the character 45 and includes a supporting wheel 46 to assist in supporting the body 6 horizontally when the trailer is uncoupled from the towing vehicle and arranged in a parked position. The wheel 46 may be adjusted vertically so as to be clear of the ground when the trailer is being towed by the motor vehicle.

To permit easy adjustment of the sections 18 and 19 relative to the sections 20 of the frame, the load is removed from the wheels 39 by elevating the rear end of the section 20 by a jack or similar device while the forward end of the section 20 is supported by the towing vehicle or by the wheel 46. The wheels 39 may then slide laterally over the surface of the ground with a very small resistance offered thereby to the sections 18 and 19.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a trailer, a body composed of intermediate and outer sections, said intermediate section overlapping the outer sections and provided with shoulders, ribs formed on the outer sections to abut said shoulders and provided with grooves provided with undercut walls, strips having beveled faces fitting within the grooves and secured to the inner face of the intermediate section, a frame for the support of the body and composed of telescopic sections to permit the body sections to be adjusted, and supporting wheels carried by the frame.

2. In a trailer, a body composed of intermediate and outer sections, said intermediate section overlapping the outer sections and provided with shoulders, ribs formed on the outer sections to abut said shoulders and provided with grooves provided with undercut walls, strips having beveled faces fitting within the grooves and secured to the inner face of the intermediate section, a frame for the support of the body and composed of telescopic sections to permit the body sections to be adjusted, supporting wheels carried by the frame, rigid flooring secured in the outer sections of the body, and a removable intermediate section or flooring removable from the first-named flooring and composed of a flexible strip and a series of rigid strips secured thereto.

JACOB J. McGLOTHLIN.